United States Patent [19]
Wang et al.

[11] Patent Number: 5,490,217
[45] Date of Patent: Feb. 6, 1996

[54] AUTOMATIC DOCUMENT HANDLING SYSTEM

[75] Inventors: Ynjiun P. Wang, Stony Brook; John Chu, Port Jefferson Station, both of N.Y.

[73] Assignee: Metanetics Corporation, Fort Myers, Fla.

[21] Appl. No.: 185,701

[22] Filed: Mar. 5, 1993

[51] Int. Cl.⁶ .................................................. H04L 9/00

[52] U.S. Cl. .............................. 380/51; 380/23; 235/462; 235/494

[58] Field of Search ................................ 380/51, 23–25; 235/462, 464, 494

[56] References Cited

U.S. PATENT DOCUMENTS

| | | | |
|---|---|---|---|
| 4,802,218 | 1/1989 | Wright et al. | 380/51 |
| 4,807,287 | 2/1989 | Tucker | 380/51 |
| 4,888,803 | 12/1989 | Pastor | 380/51 |
| 5,113,445 | 5/1992 | Wang | 380/51 |
| 5,159,635 | 10/1992 | Wang | 380/51 |
| 5,337,361 | 8/1994 | Wang et al. | 380/51 |

*Primary Examiner*—Salvatore Cangialosi
*Attorney, Agent, or Firm*—Kenneth P. Robinson

[57] ABSTRACT

A system and method for the filing, retrieving, verifying, translating, exchanging and updating documents by scanning said documents into and storing said documents on a programmed computer system, which system generates or assigns to each document handled a two-dimensionable machine readable image code which contains content and identifying information about the document, as well as information about the document format, and processing instructions. In addition the machine readable image code may contain information concerning textural and/or pictorial content of the document, bio-metric information and the like.

35 Claims, 8 Drawing Sheets

FIG. 10

Company XYZ Purchase Order

Bill to:
Company: XYZ Inc.
Street: 3 Liberty St.
City: Washington
State: New York  Zip: 10001

| Item No. | Part No. | Description | Qty | Price | Amount |
|---|---|---|---|---|---|
| 1 | 100 | Computer System Unit | 45 | 1,000 | 45,000 |
| 2 | 200 | VGA Monitor | 40 | 500 | 20,000 |

Subtotal  65,000
Tax  6,000
Total  71,000

Translation Table

Form type:   Purchase Order
Bill to:     Yes
Company:     XYZ Inc.
Dept:
Street:      3 Liberty St.
City:        Washington
State:       New York
Zip Code:    10001
Ship To:     No
Item:        Item No., Part No., Description, Qty, Price, Amount
Item:        1, 100, Computer System Unit, 45, $1000, $45000
Item:        2, 200, VGA Monitor, 40, $500, %20000
Tax:         9%

FIG. 12

AUTOMATIC DOCUMENT HANDLING SYSTEM

BACKGROUND OF THE INVENTION

1. Field of the Invention

The present invention relates to a system and method for the handling of documents. More particularly the present invention relates to a system and method for the filing, retrieving, verifying, notarizing, translating, exchanging and updating of documents and other forms of information through the use of two-dimensional machine readable image codes. Furthermore, the present invention relates to a system and method for the handling of documents by encoding a document including text, picture, document format and the processing instructions using machine readable image codes affixed or produced on the document itself.

2. Description of the Prior Art

Any office, medical facility, business or the like is responsible for and by its nature generates and must maintain in an orderly fashion (as required both by the efficient operation of such entity as well as, in some case, by law) an ever increasing amount of documents. These documents must be maintained in an accurate and easy to retrieve and verify fashion. In addition, these documents must be updateable and updated without the introduction of errors.

Systems and devices to handle such documents, known in the art, suffer from several defects, not the least of which is human intervention in filing, retrieving, updating and otherwise processing a document. In addition, even when the handling system incorporates a computer, the known systems still require human input and modification of documents, a central database accessible by all users of the system (remote or "on site") and may require large physical storage capacity for the document generated by such a system.

Furthermore, as is known in the art, there are two key technologies to automate the document processing: one is the technology of how to store documents on a computer, and the other is the technology of how to transform a human readable document into machine readable format.

Regarding the first technology, the most popular prior art is the Document Imaging System. Such systems treats all documents as images, after scanning in the documents, the documents are stored in image forms. In order to store the images for later reference, the operator needs to key in an ID number, abstract, and/or other annotation. The document stored in such system cannot be edited or translated easily due to the nature of image format.

The second technology includes two most popular methods: one is Optical Character Recognition (OCR), the other is one dimensional bar-code. The OCR transforms the human readable characters into ASCII code. This method suffers two serious problems. The recognition rate is still not high enough [usually at 96–98%; this is not high enough for recognizing a blood type or money/bank transaction]. In addition, OCR based systems cannot handle the document format problem. Furthermore, although the one dimensional bar-code method has much lower error rate (about 0.01%), it can only handle few characters per code. This kind of capacity is not enough for document storage.

It is therefore an object of the present invention to provide a system and method which reduces and/or eliminates manual modification, including and/or filing of documents.

It is another object of the present invention to provide a system and method that is easy to use and operate and requires little operator involvement.

Still another object of the present invention is to provide a system for recall and review of documents stored in said system.

Still another object of the present invention is to provide a document identifying system.

Yet another object of the present invention is to provide a system for relating documents to an identified entity.

Still another object of the present invention is to provide a system which provides for document translation, notarization and verification.

Still another object of the present invention is to provide a system which provides for efficient document exchange (electronics or otherwise).

Still another object of the present invention is to provide a system which provides for document encryption.

Further objects and advantages of the present invention shall become apparent from the following specification taken in conjunction with the attached drawings.

SUMMARY OF THE INVENTION

In accordance with the teachings of the present invention, there is herein described and illustrated an automatic document handling system which includes programmed general purpose computer means for processing and storing documents. Input and output devices are operatively interconnected with the computer means. The system of the present invention is also comprised of a two-dimensional machine readable image code which image code encodes identifying, content and document, format information, processing instructions, and encryption keys (schemes for providing document security) concerning each document handled by the system. The present invention further includes program means for generating said image code initially based on the above listed features of the document handled and further for subsequently modifying said image code based on the modification, alteration and/or expansion of said document.

In one embodiment of the present invention a document in human readable form is scanned into said system and a machine readable image code is created containing identity and content information relative to that document. The machine readable image code can than be reproduced and/or printed by the system and used to retrieve said document from the system at a later time. In addition, if said document is altered, the altered version may be re-entered into the computer, the computer storage location of the original version of the document being identified by the information in said machine readable image code and then stored information may be updated based on the content of the altered version of the document. The machine readable image code itself is then modified to reflect the new information associated with the document in question.

Furthermore, a sufficient amount of information may be encoded in the machine readable image code such that with only the machine readable image code itself the entire document may be reproduced at another location without having to access the information stored on the system which produced the machine readable image code.

In a second embodiment of the present invention, the system may be used to generate a document in human readable form which document has associated therewith (also generated by the present system) a two dimensional machine readable image code containing the above described document identifying and content information, as well as the other above described attributes of the document.

In either of these embodiments, the document described may be transmitted or forwarded either physically by human delivery means or by any of the described communication means. Upon its arrival the document may be used as paper documents as is traditionally done.

As contemplated by this invention, the document may be scanned in (if in paper form) or received by (if transmitted electronically) by a second, stand alone system of the type described herein. If the document is so handled, the two-dimensionable machine readable image code will contain instructions as to how the document is to be handled by the system of the present invention. This may include electronic storage of the document, modification of already stored versions of the document, the generating of additional paper documents, verifying the authenticity of the document and the like.

Yet another embodiment of the present invention is a system which may be used to encode certain identifying information such as an actual signature, seal, finger prints, retina feature, facial picture, significant dates and the like into the machine readable image code. The encoded (an encrypted if desired) image may then be reproduced on a document such as a check, passport, etc. When the bearer of such document attempts to use same, the information contained in the machine readable image code may be scanned, decoded (and decrypted) at the user's site and compared to the human readable information contained on the image-containing document, or the bearer's fingerprints, retina feature, facial feature, signature, etc., in real time.

BRIEF DESCRIPTION OF THE DRAWINGS

FIG. 10 is an illustrative view of still another embodiment of the present invention.

FIG. 12 is an illustrative view of still another embodiment of the present invention.

DETAILED DESCRIPTION OF THE INVENTION

Figure 1:
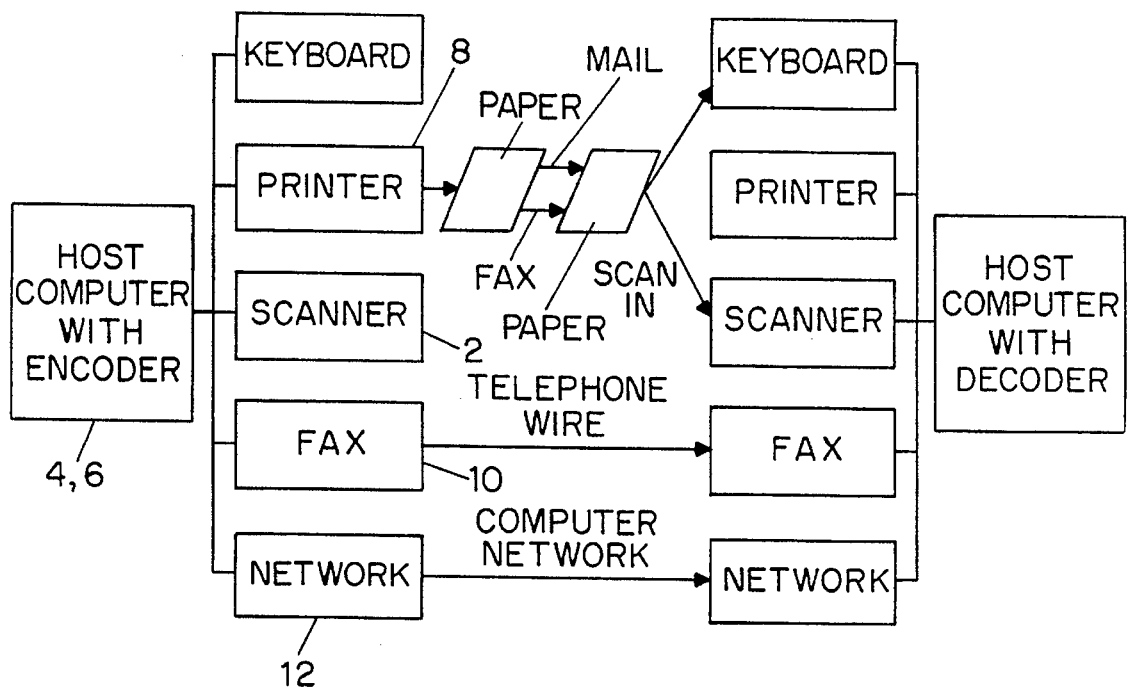
FIG. 1 is a block diagram of the system of the present invention.
Figure 2:
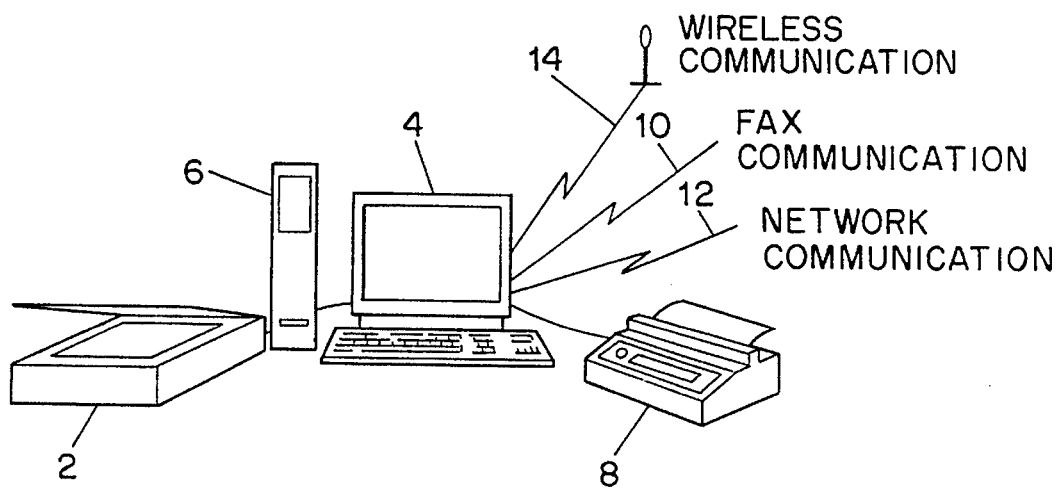
FIG. 2 is an illustrative perspective view of the system hardware used in the present invention.

Referring now to FIGS. 1 and 2, there is an illustrated a block diagram and perspective view of the hardware used in association with the present invention. The hardware is comprised of scanner 2, a machine readable image code encoder and decoder 4, a database server 6, a printer 8 and communication means such as a facsimile machine 10 network communication means 12, wireless communication means 14 and the like.

The encoder/decoder 4 will typically be a standard programmable micro-computer and includes a display, CPU, keyboard, diskdrive and memory which computer in turn controls the database server, scanner, printer and communication functions in a manner well known in the art. The computer scanner, printer and communication features are of a type and nature typically known in the industry and must be capable of reading, scanning, printing or transmitting machine readable image codes, hand written and machine produced human readable characters and the like.

Figure 3:
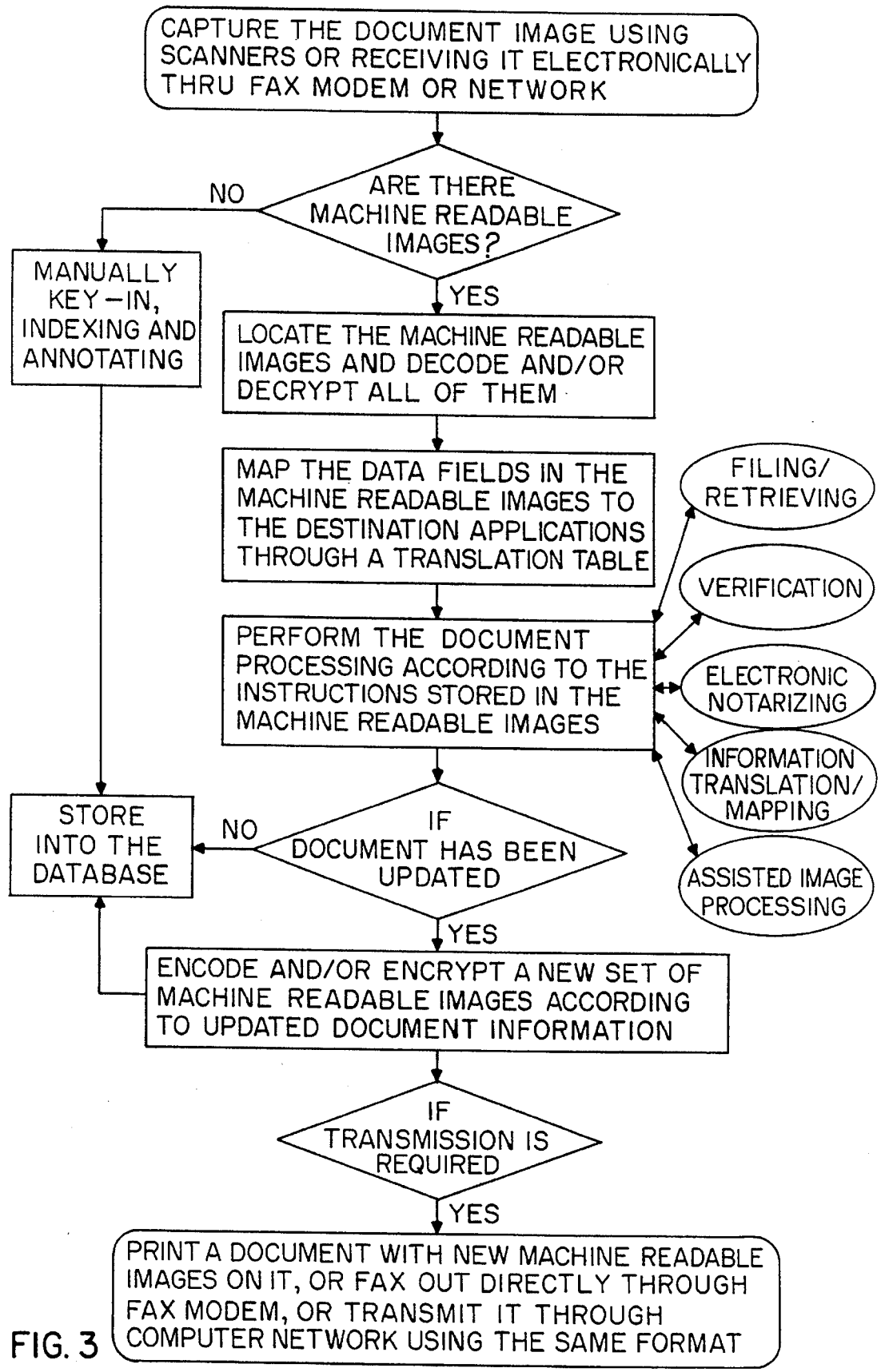
FIG. 3 is a computer flow chart outlining the function of the program news of the present invention.
Figure 5:
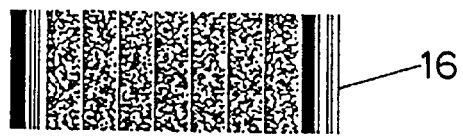
FIG. 5 is an illustrative view of the two-dimensional machine readable image code of the present invention.

The present invention further comprises a two-dimensional machine readable image code 16 (see FIG.5), which is created, manipulated, printed, modified and/or included by the system of the present invention through the use of program means provided as part of the present system. A functional flow diagram of the requirement of the program news of the present invention are shown in FIG. 3.

Figure 4:
FIG. 4 is an illustrative view of a one-dimensional machine readable image known in the art.

The two-dimensional machine readable image code 16 used in combination with the present invention is of the type referred to in U.S. Pat. No. 5,113,445. This type of machine readable image code is contrasted with the more well known one-dimensional machine readable image code (UPC bar code) by comparing FIGS. 4 and 5. The machine readable image code 16 used in the present invention has the advantage of a higher information storage capablility, as well as damage recovery/error correction capability.

Figure 6:
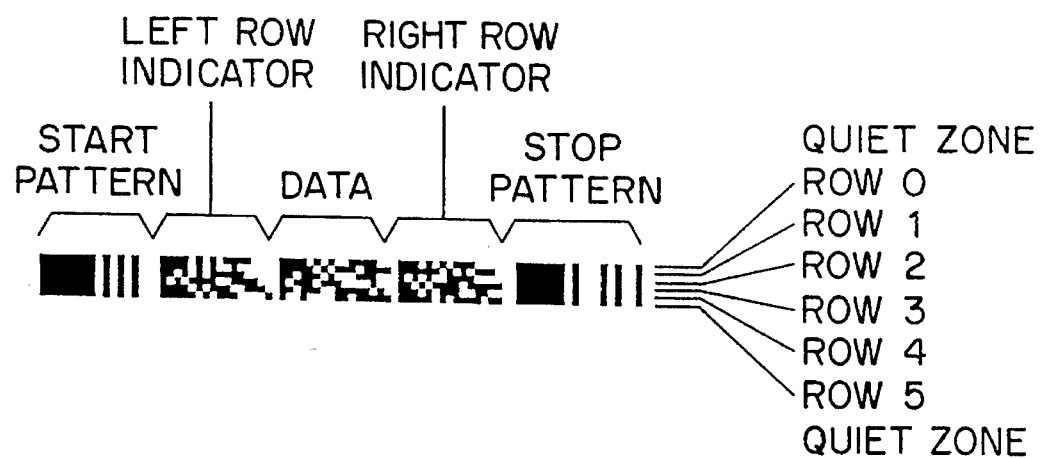
FIG. 6 is an exploded view of the image code of FIG. 5.

As shown in FIG. 6 which is an exploded view of a two-dimensional machine readable image code used advantageously in the present invention the machine readable image code is comprised of a pattern of vertical bars of pre-determined length that are spaced at various vertical and horizontal intervals. The information stored in machine readable image code is a function of the size, frequency and location of the vertical bars. The process of encoding information in this manner is more completely described in the above referenced U.S. Pat. No. 5,113,445.

The operation of of the system of the present invention can be best described and illustrated in the processing of two categories of document. The first category is documents generated without a machine readable image code. In order to file these type of documents, manually indexing/annotating such document's machine readable image code is required. After this indexing/annotating, the document can be filed/retrieved/printed by the invention system containing the index/annotation in machine readable image code form. The second category of documents generated by the system of the present invention contain the machine readable image code affixed thereon. This kind of documents can be filed automatically without human intervention, even if the document has been modified by human or machine.

The machine readable image code 16 document (the second category) can be scanned by a page scanner 2, a fax machine 10 or the like and processed by the decoder 4 and filed in the database server 6 for future reference. When retrieving document, the encoder 4 will encode the index/annotation and other identification/content information such as format and processing instructions, encryption keys, etc., in the machine readable image code 16, and the encoder 4 can prepare and/or print the document combined with the machine readable image code 16. This special form can be sent over the FAX machine 10, network 12, wireless network 14 or even by mail. The receiver can use a second system configured in accordance with the present invention to automatically file the document, translate the data into the corresponding destination fields of the receiver's application, and/or process it by scanning same into the system and electronically storing the document in accordance with the information contained in the machine readable image code.

Furthermore, in the process of encoding and/or decoding of a document, the machine readable image code may be modified by this system to reflect the date, time, abstract of the information, pictorial and textural features extracted from the document, and the like which can be incorporated and serve as the authentication means. Therefore, the document while transferring/filing can be validated in real time.

Additionally, and as described above, the machine readable image code 16 of the present invention may contain information about the entire content of a document in which case it would be necessary only to transfer or otherwise deliver the image code to another owner/user of a system of the present invention. Upon receipt of the machine readable image code document, the receiver need only scan the Image code and electronically store the information or otherwise reproduce the document in proper form from the information contained in the machine readable image code.

Finally, the information encoded in the machine readable image code 16 of the present invention may be encrypted as well during the encoding process to provide for the security of information contained in the machine readable image code. Any encryption scheme known in the art such as discussed in U.S. Pat. No. 5,016,214 may be used in accordance with the present invention.

ALTERNATE EMBODIMENTS OF THE PRESENT INVENTION

The following are specific examples of the system of the present invention which are provided to exemplify but not to limit the scope of the present invention.

1. Medical Records

Figure 7:
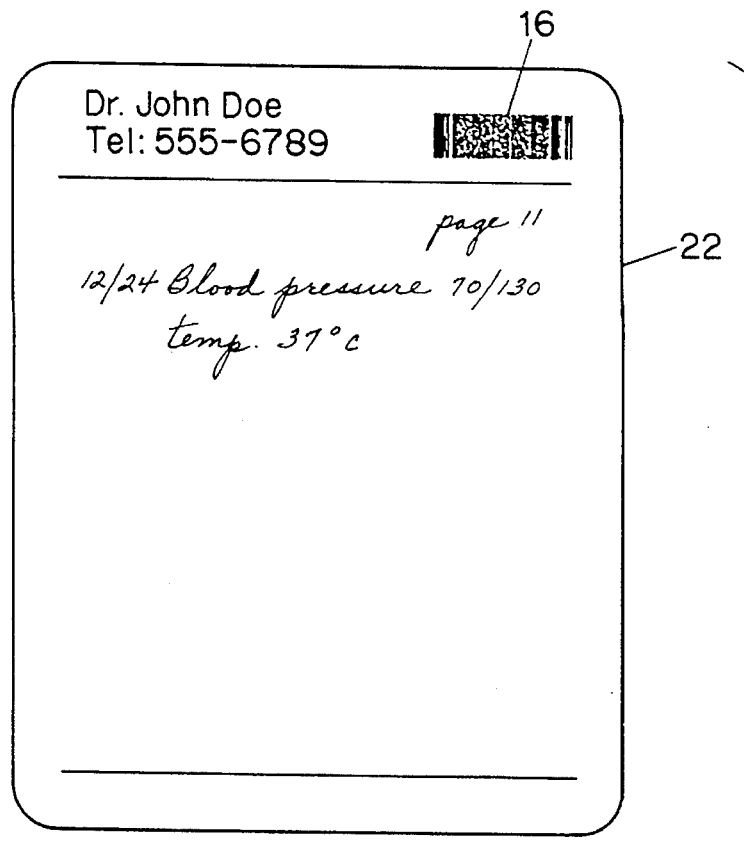
FIG. 7 is an illustrative view of one embodiment of the present invention.
Figure 7:
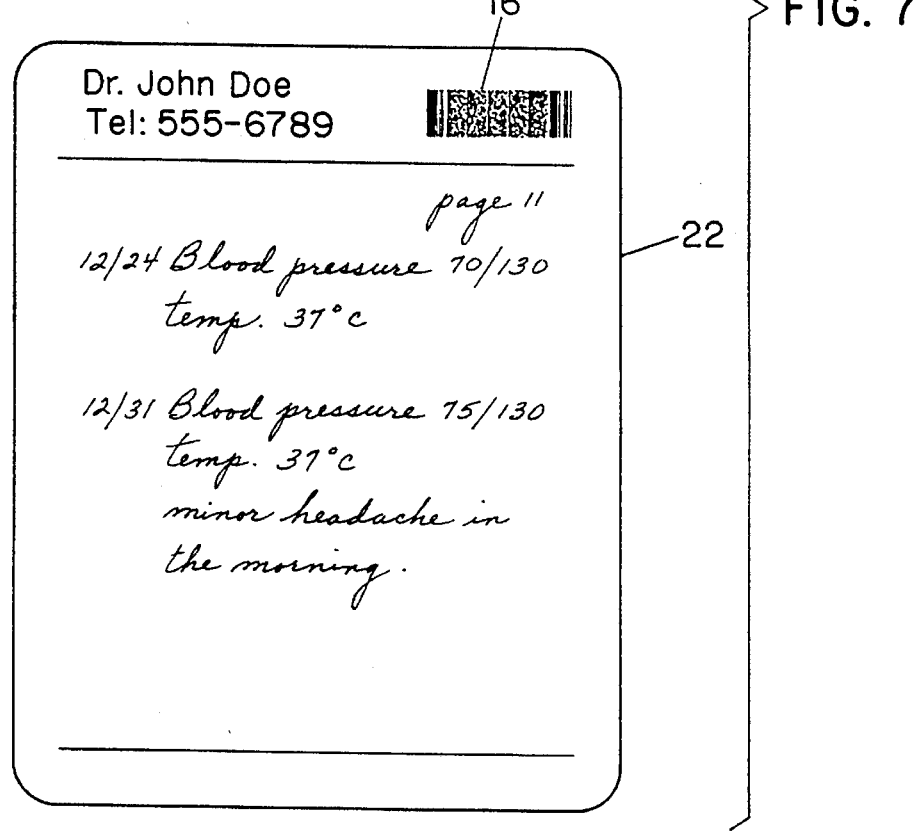

A patient medical progress chart 22 (FIG. 7) may be generated by the system of the present invention containing a two-dimensional machine readable image code form 16, which machine readable image code will initially contain information about the form type, patients historical information (name, address, social security number, billing rate, insurance information and the like), number of pages of the record and the like. After the machine readable image code containing form 22 is created the user thereof (i.e., a doctor) can record information, in typed form or even handwritten, thereon which subsequently may be rescanned by the system of the present invention which system will update the computer file on the system and modify the machine readable image code 16 to reflect the addition of new information to that patient's file. When a patient visits a doctor's office or a hospital, a machine readable image code containing medical ID issued to the patient will be scanned, then the present invention system will automatically retrieve the patient's file and display and/or print same.

2. Passports

Figure 8:
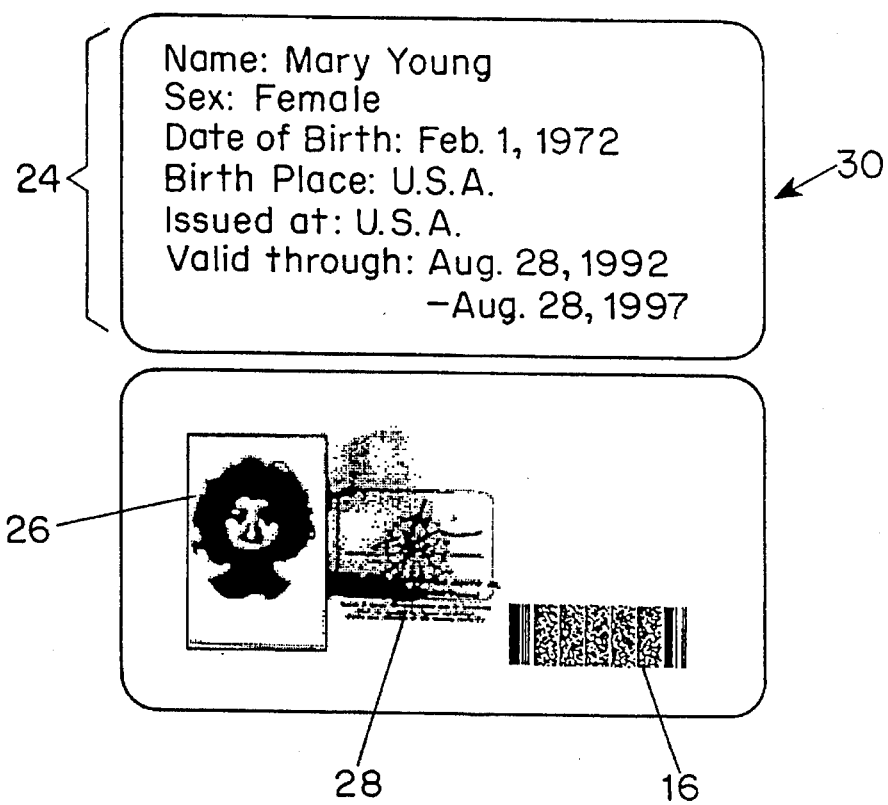
FIG. 8 is an illustrative view of another embodiment of the present invention.
Figure 9:
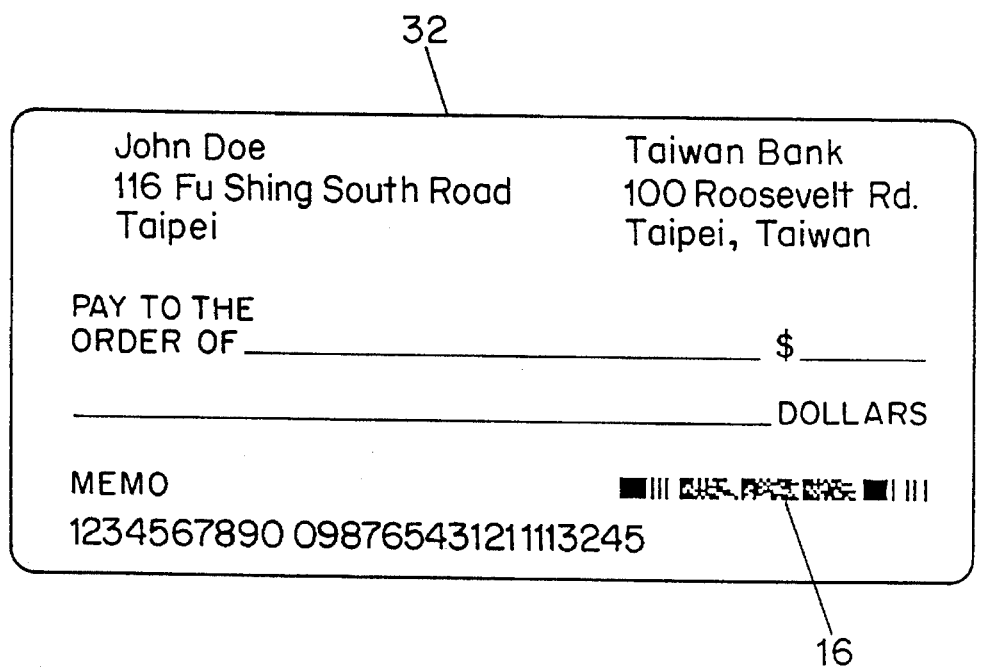
FIG. 9 is an illustrative view of yet another embodiment of the present invention.

As shown in FIG. 8, the personal information 24, photograpgh image 26 and signature 28 on a passport 30 can be encoded into a machine readable image code 16 and said machine readable image code may be affixed to the passport 30 in a single pass process by printing the machine readable image code on it directly. The passport 30 can be verified as to its authenticity in real time without referring to the remote central database. The encodation process cannot be duplicated without the secret encryption key. However, it may be decoded by a much simpler scheme known in the art. The operator can compare decoded result to see if it matches the human readable information on the document. Other biometric information, such as fingerprint, retina pattern, facial picture, etc., can be encoded into the machine readable image code incorporated into the document and can be used to verify the authenticity of the document holder. This method can also be used on the driver license, bank checks 32 (as shown in FIG. 9), and the like.

3. Tax Returns

Figure 10:
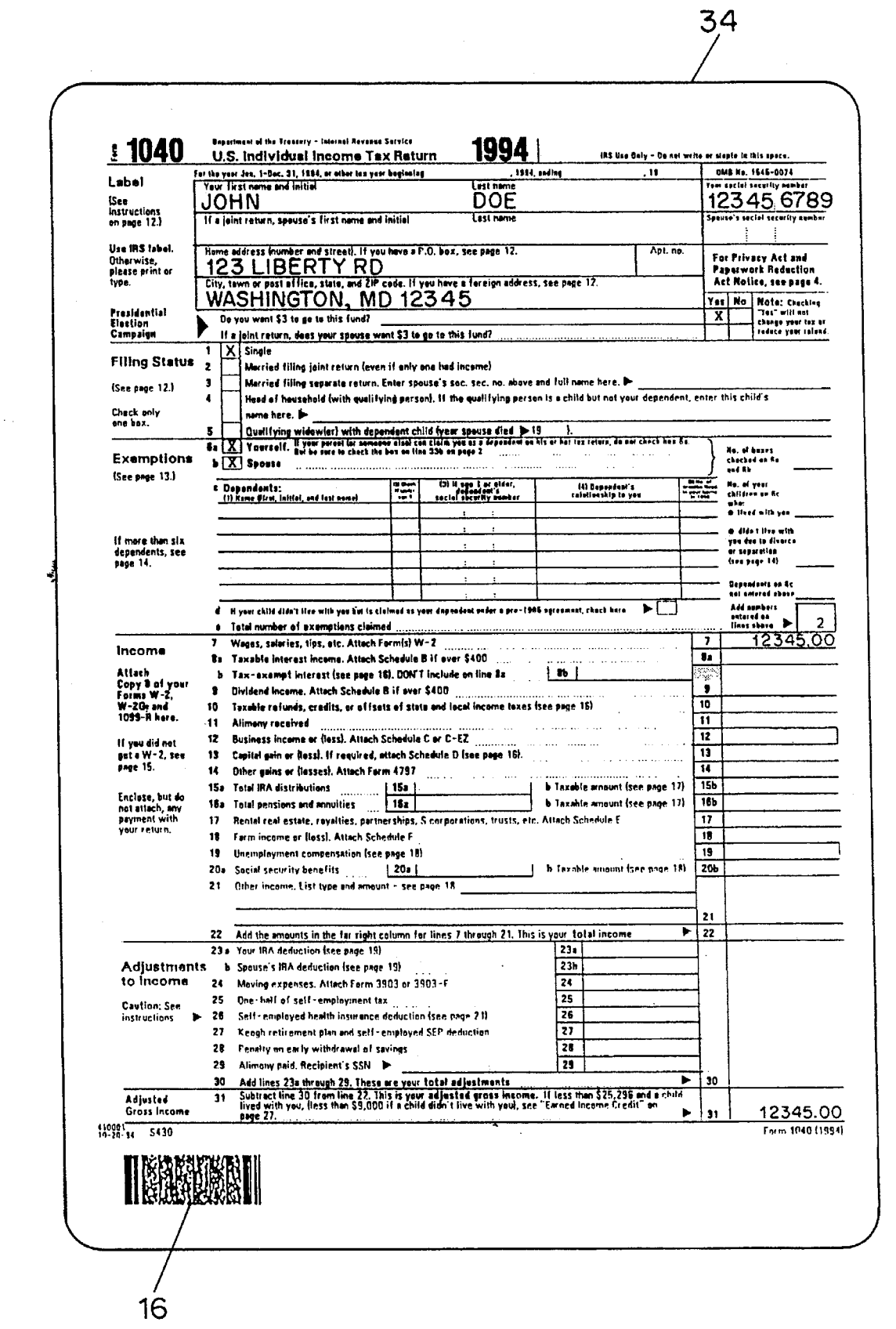

As shown in FIG. 10, the system of the present invention also has application in the preparation of tax returns 34. As presently handled, a computer filed tax return 34 results in a document containing a column of pertinent numbers which are then entered manually by a human operator into a computer system.

However, a tax return 34 prepared by the present system, in addition to the standard form and information, would contain a two-dimensional machine readable image code 16 which contains all of the taxpayer information and the type of form filed as well as the numerical information reported by the taxpayer. The machine readable image code 16 may then be scanned directly into the taxing authorities computer system. This process eliminates the errors introduced by the manual entry system.

Similarly, as can be seen in FIG. 12, the same method can also be used on all kinds of business transaction forms such as purchase order, invoice, bill of lading, etc. With the aid of a translation table, different business systems can exchange information through different business transaction forms which are embedded with the same field definitions of the two dimensional machine readable image code.

A document, i.e. purchase order 36, with data fields of name, address, ship to, items, quantities, etc., can be encoded in a universal form containing unique fixed data fields called translation tables 38, such that the data fields in the document can be mapped to this unique fixed data fields in the translation table 38 according to their meanings. The two dimensional machine readable image code 16 contains the information in the format of the translation table instead of the original purchase order format. Additionally, the machine readable image code may contain the format of the original document.

The advantage of using translation table 38 to encode the business transaction document is the ease of exchanging information from system to system in this form. For example, an invoice system receiving the above prepared purchase order 36, can scan in the two dimensional machine readable image code on the purchase order and "understand" the data fields through the translation table. Because the look of the purchase order form may differ from one company to the other company, the translation table 38 used for encoding the data fields can be defined and used by all different forms and companies.

4. Electronic Notary

Figure 11:
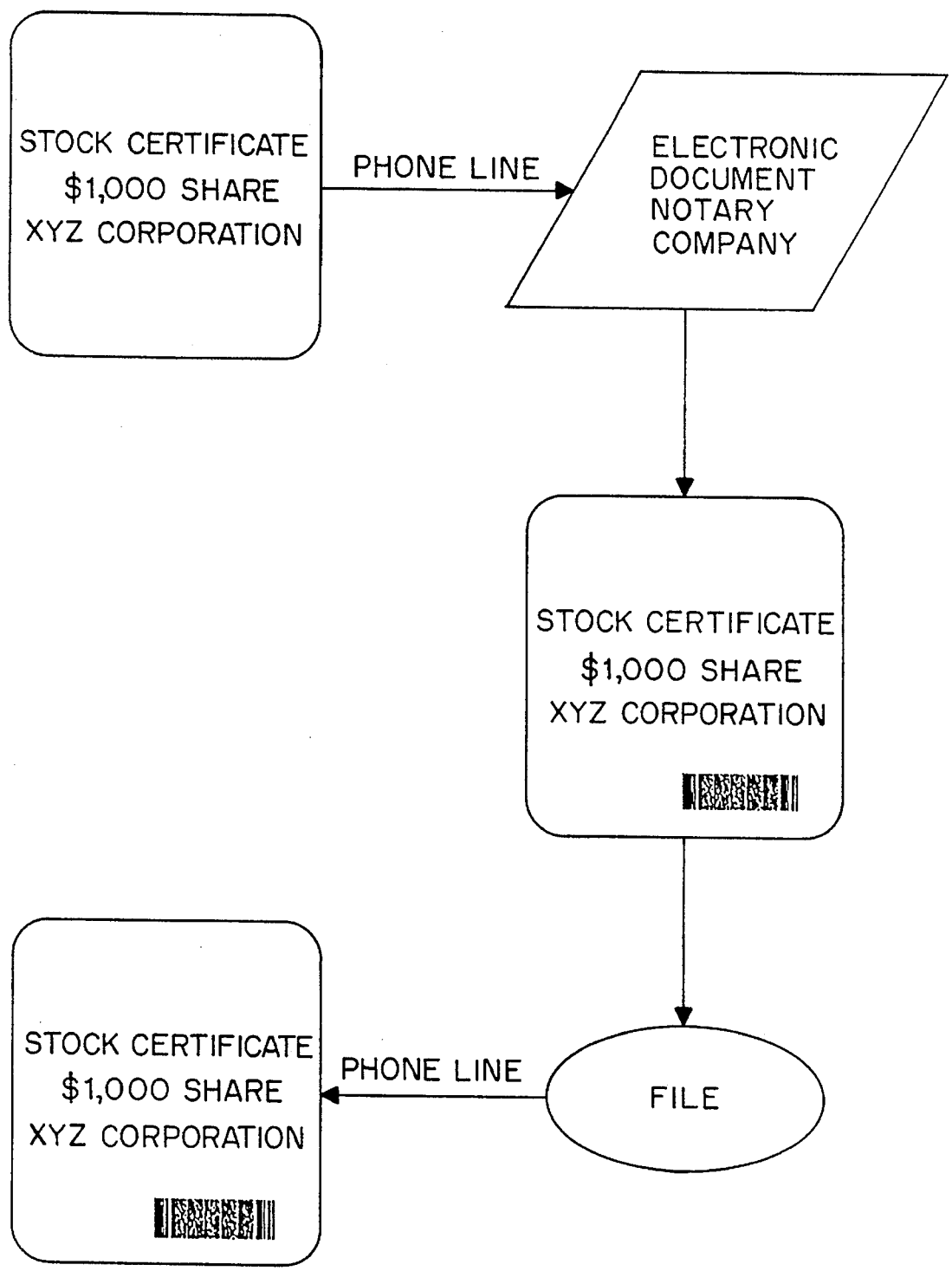
FIG. 11 is an illustrative view of still another embodiment of the present invention.

As shown in FIG. 11, the system of the present invention also has application in the electronic verification process. The operation can be described as following: whenever there is a need for verifying a document, one can transmit the document image through FAX or computer network to an independent third party institute or company. The company can process the document image by locking the document image and extracting the pictorial and texture features, then encrypt these features, time stamp, place, and the items needed to be verified into a machine readable image code. The verification information will be stored in the company's database for later reference. The original document with the resulting machine readable image code embedded will be transmitted through the same communication means back to the applicant.

When a need of verifying a document arises, the document can be transmitted back to the company. The system will automatically check whether the pictorial features and information on the document matches the pictorial features and information stored in the embedded two dimensional machine readable image code. If yes, then the system can double check the database record to confirm the verified transaction existed. If both verification processes succeed, the validity of the verified document, is confirmed.

With a similar method and bio-metric and other like information, one can issue an airline ticket, theater ticket, securities (e.g. stock certificate), etc. over the phone line, through FAX or computer network.

The examples and description given above, although they set forth numerous characteristics of the present invention together with details of the structure and function of the invention, are illustrations only. Therefore, changes may be made in detail without going beyond the spirit and scope of this invention. Accordingly, it will be appreciated by those skilled in the art that, within the scope of the appended claims, the present invention may be practiced in embodiments other than has been specifically described herein.

What is claimed is:

1. A document handling system, comprising:
    at least one input device enabling information content (including at least one of text, data, an image and hand-entered information) and reference information related to said information content (including information provided for purposes of at least one of identification, authentication and processing control);
    an encoder device coupled to said at least one input device and configured to encode said reference information and at least a portion of said information content into a two-dimensional machine readable image code (2-D image code);
    an output device coupled to said encoder device and configured to output at least a representation of said 2-D image code; and
    a utilization unit responsive to said representation of said 2-D image code and configured to read and decode said 2-D image code and utilize decoded reference information for purposes of at least one of identification, authentication and processing control relating to said information content.

2. A document handling system as in claim 1, wherein said output device is configured to output said representation of the 2-D image code as one of the following: a printed representation on a document, an output coupled to a facsimile transmitter, and an output coupled to a computer network.

3. A document handling system as in claim 1, wherein said output device is configured to additionally output said information content in a human readable form.

4. A document handling system as in claim 1, wherein said utilization unit is configured to make available said information content in a human readable form for at least one of signature authentication and document authentication purposes.

5. A document handling system as in claim 1, wherein said utilization unit is configured to make available said information content in a human readable form on a document usable for one of: review of said information content, revision of said information content, and replacement of said information content.

6. A document handling system as in claim 1, wherein said utilization unit is configured to process said information content pursuant to said reference information.

7. A document handling system as in claim 1, additionally comprising a storage device coupled to said input device and configured to store said reference information and at least a portion of said information content.

8. A document handling system, comprising:
    at least one input device enabling input of information content (including at least one of text, data, an image and hand-entered information) and reference information related to said information content (including information provided for purposes of at least one of identification, authentication and processing control);
    an encoder device coupled to said at least one input device and configured to encode said reference information and at least a portion of said information content into a two-dimensional machine readable image code (2-D image code); and
    an output device coupled to said encoder device and configured to output at least a representation of said 2-D image code.

9. A document handling system as in claim 8, additionally comprising a storage device coupled to said input device and configured to store said reference information and at least a portion of said information content.

10. A document handling system, enabling information to be stored and accessed by use of a two-dimensional machine readable image code (2-D image code), comprising:
    a storage device configured to store information content (including at least one of text, data, an image and hand-entered information) and reference information identifying said information content;
    an encoder device coupled to said storage device and configured to encode at least said reference information into said 2-D image code;
    an output device coupled to said encoder device and configured to output a document including a representation of said 2-D image code and at least a portion of said information content in human readable form;
    an input device configured to provide image data representative of both said 2-D image code and modified information content after at least one of a change, addition and deletion of said information content has been entered on said document;
    a decoder device responsive to said image data and configured to decode said 2-D image code to provide decoded reference information; and
    a computer device responsive to said decoded reference information and configured to cause said modified information content to be coupled to said storage device for at least one of storage and modification of information previously stored.

11. A document handling system as in claim 10, wherein said output device is configured to output a medical record document for a specific patient, said document is made available for modification on said document of information regarding said patient, and said computer device is configured to cause modified patient information to be stored in said storage device.

12. A document handling system as in claim 10, wherein said encoder device is configured to encode both said reference information and at least a portion of said information content into said 2-D image code.

13. A document handling system as in claim 12, wherein said output device is configured to output a representation of said 2-D image code as an output coupled to one of a facsimile transmitter and a computer network, and said document is provided as an output at a remote location.

14. A document handling system, enabling signature authentication in use with a document bearing thereon a representation of an individual's signature encoded into a two-dimensional machine readable image code (2-D image code) in one of an encrypted, unencrypted and partially encrypted format, comprising:

a reader device configured to provide image data representative of said 2-D image code on said document;

a decoder device coupled to said reader device, having access to any necessary encryption key, and configured to decode said 2-D image code as represented by said image data; and a display device coupled to said decoder device and configured to display an image of said individual's signature as previously encoded, to enable comparison with a hand-written signature.

15. A document handling system as in claim 14, additionally including a document preparation system comprising:

an encoder device configured to encode said individual's signature into said 2-D image code in one of an encrypted, unencrypted and partially encrypted format; and an output device coupled to said encoder device and configured to provide a representation of said image code on said document.

16. A document handling system as in claim 15, wherein said output device is configured to provide a representation of said image code on one of the following: a check, a driver's license, an identification card, a passport and a document to be signed by said individual.

17. A document handling system, enabling signature authentication in use with a document bearing thereon a representation of an individual's signature encoded into a two-dimensional machine readable image code (2-D image code) in one of an encrypted, unencrypted and partially encrypted format, comprising:

a reader device configured to provide image data representative of both said 2-D image code and a handwritten signature on said document;

a decoder device coupled to said reader device, having access to any necessary encryption key, and configured to decode said 2-D image code as represented by said image data; and a computer device coupled to said reader device and said decoder device and configured to compare said handwritten signature as represented by said image data with said individual's signature as represented by said decoded 2-D image code, to enable a determination of one of authentication and lack of authentication of said handwritten signature.

18. A document handling system as in claim 17, additionally including a document preparation system comprising:

an encoder device configured to encode said individual's signature into said 2-D image code in one of an encrypted, unencrypted and partially encrypted format; and an output device coupled to said encoder device and configured to provide a representation of said image code on said document.

19. A document handling system as in claim 18, wherein said output device is configured to provide a representation of said image code on one of the following: a check, a driver's license, an identification card, a passport and a document to be signed by said individual.

20. A document handling system, enabling document authentication, comprising:

a first reader device configured to provide image data representative of at least a portion of the information content of a first document;

an encoder device coupled to said reader device and configured to encode said image data into a two-dimensional machine readable image code (2-D image code) in one of encrypted, unencrypted and partially encrypted format;

a storage device coupled to said first reader device and said encoder unit and configured to store data representative of said information content and said 2-D image code;

an output device coupled to said storage device and configured to provide a representation of said 2-D image code on a copy of said first document;

a reader device, which may be said first reader device, configured for use with a second document purported to be said first document, but which may have been altered, to provide image data representative of said 2-D image code and of at least a portion of the information content of said second document;

a decoder device coupled to said reader device, having access to any necessary encryption key, and configured to decode said 2-D image code as represented by said image data; and a processing device coupled to said reader device and said decoder device and configured to compare said information content of said second document as represented by said image data with at least one of said information content as represented by said data stored in said storage device and said information content as represented by said 2-D image code, to enable a determination of one of authentication and lack of authentication of said second document.

21. A document handling system as in claim 20, wherein said first reader device is configured to provide a representation of at least a portion of one of the following types of documents: airline ticket, theater ticket, stock certificate, and other forms of documents.

22. A document handling system, enabling automated entry of data from a received document, comprising:

A document preparation system including:

a data entry unit including a display and configured to display a selected document form and receive input data intended for entry at a form position relative to said document form;

an encoder device coupled to said data entry unit and configured to encode said input data, classification data relating to said form position of said input data, and form ID data identifying said selected document form, into a two-dimensional machine readable image code (2-D image code); and an output device coupled to said encoder device and configured to output a representation of said 2-D image code; and A document processing system including:

a reader device configured to provide image data representative of said 2-D image code;

a decoder device coupled to said reader device and configured to decode said 2-D image code as represented by said image data to provide said input data, said classification data and said form ID data; and a computer device coupled to said decoder device and configured to process said input data with use of said form ID data and said classification data.

23. A document handling system as in claim 22, wherein said output unit outputs one of the following: a printed representation of said image code on a document, an electronic representation of said image code suitable for facsimile transmission, and an electronic representation of said image code suitable for coupling to a computer network.

24. A document handling system as in claim 22, wherein said data entry unit is additionally configured to provide said classification data, relating to said form position of said input data, for each position at which input data is entered by an operator and said classification data is effective to identify at least one of the form position at which specific input data was entered and a categorization of specific input data based upon the form position at which such data was entered.

25. A document handling system as in claim 22, wherein said data entry unit is configured to display a selected tax form and receive input data identifying a taxpayer and providing a dollar value entered for at least one classification of tax obligation, and said processor unit is configured to receive such input data after decoding of said image code and to process such dollar value with use of said form ID data, identifying the particular tax form, and said classification data, identifying the classification of the tax obligation represented by said dollar value.

26. A document handling system, enabling automated entry of data from a received document bearing a two-dimensional machine readable image code (2-D image code) in which the following data is encoded (a) form ID data identifying a document form, (b) input data entered at a form position relative to said document form, and (c) classification data relating to said form position of said input data, comprising:

a reader device configured to provide image data representative of said 2-D image code;

a decoder device coupled to said reader device and configured to decode said 2-D image code to provide said form ID data, input data and classification data; and a computer device coupled to said decoder device and configured to process said input data with use of said form ID data and said classification data.

27. A document handling system as in claim 26, wherein said ID data identifies one of a tax form, a purchase order form and an invoice form, said input data includes both identification of an entity and information content relating to said entity, and said computer device is configured to identify said information content with said entity and process said information content based upon the particular form involved and the classification of said information content relative to said form.

28. A method of handling documents, comprising the steps of:

(a) storing information content (including at least one of text, data, an image and hand-entered information) and reference information related to said information content (including information provided for purposes of at least one of identification, authentication and processing control);

(b) encoding said reference information and at least a portion of said information content into a two-dimensional machine readable image code (2-D image code); and (c) outputting at least a representation of said 2-D image code.

29. A method as in claim 28, additionally comprising the following steps:

(d) reading said representation of said 2-D image code;

(e) decoding said 2-D image code as represented by said image data;

(f) utilizing decoded reference information for purposes of at least one of identification, authentication processing control relating to said information content.

30. A method as in claim 28, wherein step (c) comprises outputting at least a representation of said 2-D image code in a printed format.

31. A method as in claim 28, wherein step (c) includes outputting said information content in human readable form with said representation of said 2-D image code.

32. A method as in claim 29, wherein step (c) includes outputting said information content and 2-D image code on a document and permitting said information content to be modified on said document, and step (f) comprises using said decoded reference information to cause said modified information content to be stored, in a repetition of step (a), in place of said information content previously stored.

33. A method as in claim 29, wherein step (a) comprises storing an image of an individual's signature as information content, and step (f) comprises utilizing said reference information to identify said stored signature for use in authenticating a later purported signature of said individual.

34. A method as in claim 29, wherein step (a) comprises storing an image of a portion of a first document as information content, and step (f) comprises utilizing said reference information to identify said stored portion for use in authenticating a document purported to be said first document.

35. A method as in claim 29, wherein step (a) comprises storing data associated with a blank in a form as information content, and information as to identification of said form and said blank, as reference information, and step (f) comprises utilizing said reference information to control processing of said data.

* * * * *